United States Patent [19]

Butler

[11] 4,411,615
[45] Oct. 25, 1983

[54] INJECTION MOULDING MACHINE

[75] Inventor: Richard A. Butler, Stourbridge, England

[73] Assignee: Mining & Chemical Products Limited, Middlesex, England

[21] Appl. No.: 252,439

[22] Filed: Apr. 9, 1981

[30] Foreign Application Priority Data

Apr. 9, 1980 [GB] United Kingdom ............... 8011789

[51] Int. Cl.³ .............................................. B29F 1/06
[52] U.S. Cl. ................................................. 425/591
[58] Field of Search ....................... 425/137, 138, 591

[56] References Cited

FOREIGN PATENT DOCUMENTS

| | | |
|---|---|---|
| 246982 | 5/1966 | Austria ............................. 425/591 |
| 924169 | 2/1955 | Fed. Rep. of Germany ...... 425/591 |
| 561257 | 5/1944 | United Kingdom . |
| 724103 | 2/1955 | United Kingdom . |
| 976518 | 11/1964 | United Kingdom . |
| 1250721 | 10/1971 | United Kingdom . |

Primary Examiner—Thomas P. Pavelko
Attorney, Agent, or Firm—Weingarten, Schurgin, Gagnebin & Hayes

[57] ABSTRACT

In a machine for the continuous and automatic production of a succession of small components from synthetic plastics material by injection moulding, the mould and injection unit are operatively connected to a common actuating device through two separate transmission mechanisms which both include an element reciprocable along the longitudinal axis of the machine and are so interconnected that the injection unit cannot operate until the mould has been closed.

9 Claims, 1 Drawing Figure

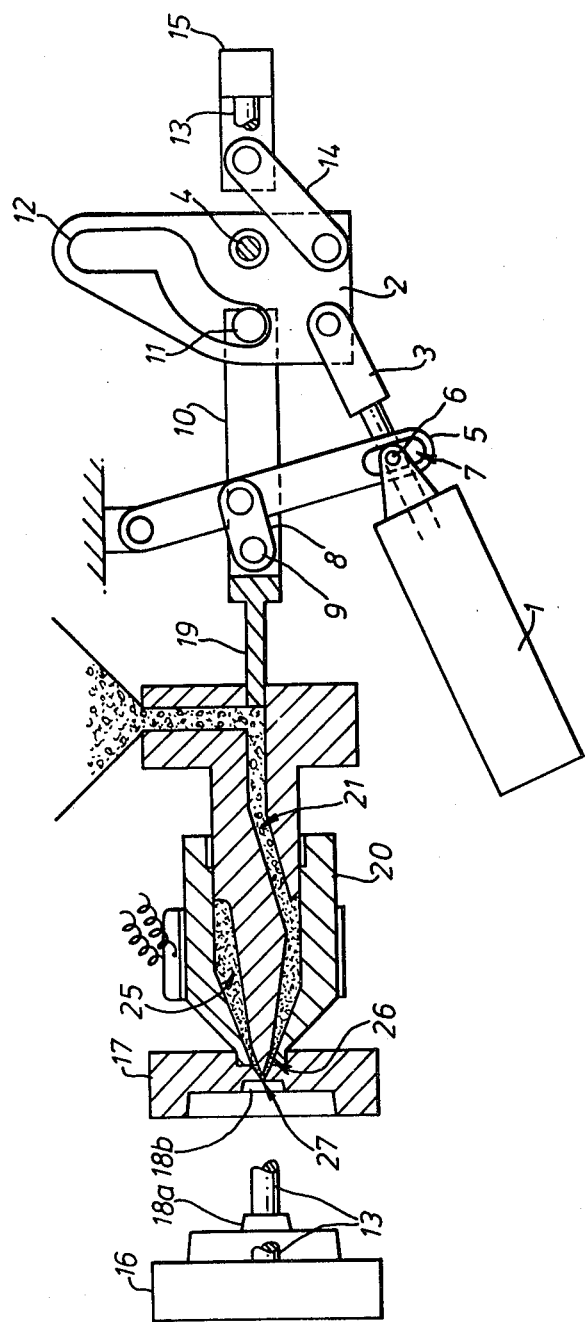

INJECTION MOULDING MACHINE

This invention relates to machines for the continuous and automatic production of a succession of small components from synthetic plastics material by injection moulding.

Conventional machines of this kind have tended to be large and thus expensive to produce and their continuous cycles of operation give rise to a considerable quantity of unused material, the melting, cooling and regranulating of which involves time and costs out of all proportion to the size and value of the components produced.

In order to reduce the size of such machines it has already been proposed to employ a single power cylinder which is operable both to close the mould and to effect injection of the plastics material into the mould, but in each case, some movement of the injection plunger always occurs prior to the mould becoming fully closed with the result that some moulding material enters the mould before closure of the latter is completed.

It is a principal object of the present invention therefore, to provide a machine which is small enough and simple enough to produce only one or two components during each operating cycle with consequent economy in running and production expenses and which is not subject to premature injection of material into the mould.

To this end, according to the invention, there is provided a machine for automatically producing a succession of small components by injection moulding, wherein the mould and injection unit are operatively connected to a common actuating device through two separate transmission mechanisms which are both reciprocable along the longitudinal axis of the machine and are so interconnected that the injection unit cannot operate until the mould has been closed.

One embodiment of the invention will be described, by way of example, with reference to the accompanying diagrammatic drawing which represents a longitudinal section through an injection moulding machine incorporating the invention.

A cylinder 1, the ends of which are alternately connectable to a source of liquid or gaseous operating fluid under pressure, contains a piston (not shown), the rod of which is pivotally connected by means of a fork 3 to a cam 2 which in turn, is pivotally mounted on a fixed pin 4. The cam 2 is connected by a pair of toggle links 14, only one of which is shown in the drawing, to a cross-heat 15 which is attached to one end of each of two slide bars 13 passing longitudinally through the machine and connecting the cross-head to a movable platen 16 carrying the movable half 18a of a mould, the fixed half 18b of which is carried by a fixed platen 17.

The cam 2 is formed with a slot 12 which receives a pin-and-roller assembly 11 secured to the carriage slide 10 of an injection plunger 19. The carriage slide 10 is provided with a pin 9 which is connected by two toggle links 8, only one of which is shown in the drawing, to an injection fork 5 pivotally mounted at its upper end on a fixed part of the machine. The lower end of the injection fork 5 is formed with slots 7 which receive rollers 6 on the end of the cylinder 1.

When fluid is supplied to the left-hand end of the cylinder 1, as viewed in the drawing, the cylinder, by virtue of its connection through the injection fork 5, toggle links 8, pin 9, carriage slide 10 and pin 11, to the cam 2, is prevented from moving while the piston is operative through the fork and link unit 3 to swing the cam 2 about its pivot 4 in an anticlockwise direction, as viewed in the drawing. This movement of the cam 2 is operative through the toggle links 14 to move the slide bars 13 to the right and, in turn, move the platen 16 and mould half 18a to the right to close the mould. Movement of the cam 2 through 90° brings the pin 11 to one end of the straight part of slot 12, whereupon the cylinder 1 is moved to the left relative to its piston and operates through the injection fork 5, toggle links 8, pin 9 and carriage slide 10 to move the injection plunger 19 to the left until the pin 11 reaches the other end of the slot 12 in the cam 2.

The injection plunger 19 is operative to force cold granulated, synthetic plastics material from a supply hopper, through a passage 21 into a heating chamber 20, where it is melted, and to force a predetermined quantity of molten material already in the chamber, through a slot 25 and nozzle 26 into the closed mould via a restricted opening 27 in the mould half 18b.

During the injection, uniform pressure is exerted on the mould half 18a by virtue of the fact that the cam 2 is prevented from rocking about its pivot 4 by engagement of the pin 11 with the sides of the slot 12.

When the hot synthetic plastics material in the mould has cooled sufficiently, the operating fluid is exhausted from the cylinder 1 and the latter returned to its original position, either by means of a spring or by supplying operating fluid to the other end thereof. Return movement of the cylinder is operative, through the injection fork 5, toggle links 8, pin 9 and carriage slide 10, to withdraw the injection plunger 19 and when the pin 11 has returned to the junction between the staight and curved parts of the slot 12, the cam is freed for return movement about its pivot 4 by the piston to open the mould and permit removal of the moulded component.

It will be understood that heating, temperature control, timing and removal of material from the mould may be carried out in conventional manner.

Closing and clamping of the mould and operation of the injection plunger are carried out by a single actuating device which is preferably a cylinder, as described, but could be a rack and pinion or other suitable devices. The mould-operating mechanism and the injection mechanism are interlocked mechanically so that injection cannot take place until the two mould halves are firmly clamped together and the clamping pressure cannot be relaxed during injection or the mould opened until the injection plunger has been fully retracted.

I claim:

1. A machine for automatically producing a succession of small components by injection moulding, comprising: a mould operable between open and closed positions by a first transmission element, and an injection unit operable by a second transmission element, said transmission elements being individually reciprocable along the longitudinal axis of the machine by a common actuating device and interconnected by means operable in response to operation of said actuating device to prevent operation of said injection unit until said mould has been closed, said interconnecting means comprising a plate connected by a toggle link to said first transmission element and formed with a cam slot which receives a cam follower on said second transmission element and is so shaped as to first permit said plate to be pivoted about its axis by said actuator to a sufficient extent to close said mould through said first transmission element and then to restrain further pivotal movement of said plate while said cam follower moves, relatively thereto, along said slot in a direction to operate said injection unit.

2. A machine according to claims 1 wherein said first transmission element comprises a cross-head at one end of the machine, connected by rods, extending longitudinally of the machine, to a movable mould part at the other end of the machine.

3. A machine according to claim 1, wherein said actuating device operates in a straight line making an acute angle with the longitudinal axis of the machine and has separate connections to said transmission elements, both said connections including a member pivotable about an axis extending at right angles to the longitudinal axis of the machine and one of said connections including a part of said interconnecting means for said transmission elements.

4. A machine for automatically producing a succession of small components by injection moulding, comprising: a mould operable between open and closed positions by a first transmission element, and an injection unit operable by a second transmission element, said transmission elements being individually reciprocable along the longitudinal axis of the machine by a common actuating device which operates in a straight line making an acute angle with the longitudinal axis of the machine and has separate connections to said transmission elements, both said connections including a member pivotable about an axis extending at right angles to the longitudinal axis of the machine and a part of one of said connections also forming a part of means which interconnect said transmission elements and is operable in response to operation of said actuating device to prevent operation of said injection unit until said mould has been closed, said interconnecting means comprising a plate connected by a toggle link to said first transmission element and formed with a cam slot which receives a cam follower on said second transmission element and is so shaped as to first permit said plate to be pivoted about its axis by said actuator to a sufficient extent to close said mould through said first transmission element and then to restrain further pivotal movement of said plate while said cam follower moves, relatively thereto, along said slot in a direction to operate said injection unit.

5. A machine according to claim 4, wherein said first transmission element comprises a cross-head at one end of the machine, connected by rods, extending longitudinally of the machine, to a movable mould part at the other end of the machine.

6. A machine according to claims 1 or 4, wherein the connection between said actuating device and said second transmission element comprises a forked lever which is pivotally mounted at one end and is operatively connected between its ends to said second transmission element by a toggle link.

7. A machine according to claim 6, wherein said actuating member is a fluid-operated piston and cylinder device, the piston of which is operatively connected to said cam plate and the cylinder of which is operatively connected to the end of said forked lever remote from its pivot.

8. A machine according to claim 7, wherein the rod of said piston passes between the forks of said lever, and said cylinder is operatively connected to said lever by means of rollers on the cylinder running in longitudinal slots in the forks of said lever.

9. A machine according to any one of claims 1 or 4, wherein said second transmission element comprises a longitudinally extending slide, one end of which carries said cam follower in the form of a pin and the other end of which carries the plunger of said injection unit.

* * * * *